(12) United States Patent
Hoffmann et al.

(10) Patent No.: US 8,890,344 B2
(45) Date of Patent: Nov. 18, 2014

(54) METHOD FOR OPERATING A MACHINE LOCATED IN CHOPPY WATERS

(71) Applicant: Robert Bosch GmbH, Stuttgart (DE)

(72) Inventors: Norbert Hoffmann, Winsen (DE); Nicolas Houis, Bietigheim-Bissingen (DE); Nik Scharmann, Bietigheim-Bissingen (DE); Benjamin Hagemann, Gerlingen (DE); Jasper Behrendt, Hamburg (DE); Markus Perschall, Aschaffenburg (DE); Alexander Poddey, Wiernsheim (DE); Daniel Seiler-Thull, Stuttgart (DE); Michael Hilsch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/709,467

(22) Filed: Dec. 10, 2012

(65) Prior Publication Data

US 2013/0147193 A1    Jun. 13, 2013

(30) Foreign Application Priority Data

Dec. 13, 2011    (EP) .................................. 11009798

(51) Int. Cl.
| | |
|---|---|
| *F03B 13/16* | (2006.01) |
| *F03B 13/20* | (2006.01) |
| *F03B 17/06* | (2006.01) |
| *F03B 15/00* | (2006.01) |
| *F03B 13/18* | (2006.01) |
| *G01C 13/00* | (2006.01) |

(52) U.S. Cl.
CPC ................. *F03B 15/05* (2013.01); *Y02E 10/38* (2013.01); *F03B 13/20* (2013.01); *F03B 17/065* (2013.01); *Y02E 10/28* (2013.01); *F03B 15/00* (2013.01); *F03B 13/1805* (2013.01); *G01C 13/002* (2013.01)
USPC .................................................. 290/42; 416/1

(58) Field of Classification Search
USPC .................................................. 290/42; 416/1
See application file for complete search history.

(56) References Cited

U.S. PATENT DOCUMENTS

| | | | | |
|---|---|---|---|---|
| 4,347,036 | A * | 8/1982 | Arnold .............................. | 416/1 |
| 4,380,417 | A * | 4/1983 | Fork .............................. | 416/108 |
| 4,752,258 | A * | 6/1988 | Hochleitner et al. ........... | 440/93 |
| 6,360,534 | B1 * | 3/2002 | Denniss .......................... | 60/398 |

(Continued)

FOREIGN PATENT DOCUMENTS

| | | | |
|---|---|---|---|
| WO | WO 2011103960 A2 | * | 9/2011 |
| WO | WO 2011120630 A1 | * | 10/2011 |

OTHER PUBLICATIONS

Dommermuth et al., A high-order spectral method for the study of nonlinear gravity waves; Journal of Fluid Mechanics; Nov. 1987; pp. 267-288; vol. 184; Great Britain (22 pages).

(Continued)

*Primary Examiner* — Joseph Waks
(74) *Attorney, Agent, or Firm* — Maginot, Moore & Beck LLP

(57) ABSTRACT

A method for operating a machine located in choppy waters, in particular a wave energy converter, for converting energy from a wave movement of a fluid into another form of energy includes determining measurement variables at a first, relatively early time, and calculating a variable characterizing a wave movement expected at a second, later time on the basis of the determined measurement variables.

13 Claims, 3 Drawing Sheets

(56) References Cited

U.S. PATENT DOCUMENTS

| | | | |
|---|---|---|---|
| 6,731,019 B2* | 5/2004 | Burns et al. | 290/42 |
| 6,768,216 B1* | 7/2004 | Carroll et al. | 290/42 |
| 6,948,910 B2* | 9/2005 | Polacsek | 416/1 |
| 7,305,823 B2* | 12/2007 | Stewart et al. | 60/495 |
| 7,686,583 B2 | 3/2010 | Siegel | |
| 8,587,139 B2* | 11/2013 | Gerber | 290/42 |
| 2010/0150716 A1* | 6/2010 | Siegel | 416/1 |
| 2011/0289913 A1* | 12/2011 | Welch et al. | 60/495 |

OTHER PUBLICATIONS

Guangyu Wu; Direct Simulation and Deterministic Prediction of Large-scale Nonlinear Ocean Wave-field; Massachusetts Institute of Technology; 2004; Cambridge, MA (259 pages).

Leonard W. Schwartz; Computer extension and analytic continuation of Stokes' expansion for gravity waves; Journal of Fluid Mechanics; Feb. 1974; pp. 553-578; vol. 62, Issue 03; Great Britain (26 pages).

\* cited by examiner

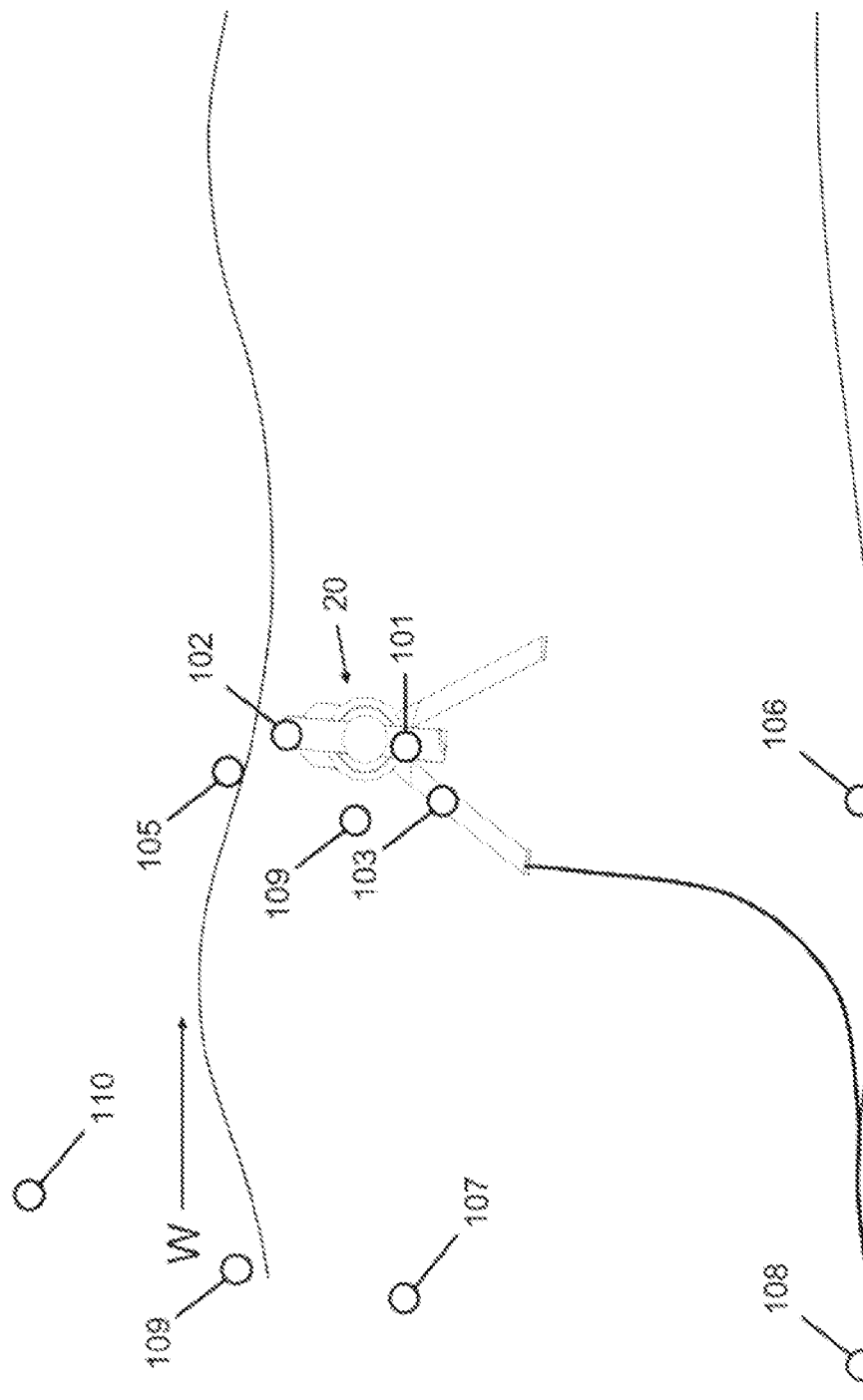

METHOD FOR OPERATING A MACHINE LOCATED IN CHOPPY WATERS

This application claims priority under 35 U.S.C. §119 to patent application no. EP 11009798.7, filed on Dec. 13, 2011 in the European Patent Office, the disclosure of which is incorporated herein by reference in its entirety.

BACKGROUND

The present disclosure relates to a method for operating a machine, in particular a wave energy converter, located in choppy waters, for converting energy from a wave movement of a fluid into another form of energy, a computing unit for carrying out said method and a correspondingly operated wave energy converter.

Wave power plants (wave energy converters) utilize the energy from sea waves to acquire electric current. Relatively new design approaches use rotating units here which convert the wave movement into a torque. In said units, inter alia hydro-dynamic floating bodies, (i.e. bodies which generate lift when there is a flow around them) are used as coupling bodies by means of which a lift moment is generated from the incoming wave, which lift moment can be converted into a rotational movement of a rotor. The corresponding coupling bodies are arranged, for example, on a crank drive. Lift forces are produced at the coupling bodies by a superimposed incoming flow from the orbital flow of the wave movement and the coupling bodies own rotation, which lift forces cause a torque to be introduced into the crank drive.

The lift of a hydrodynamic lift body can be changed by means of its pitch angle with respect to the medium which is flowing against them, for example air or water. In particular, for such rotating wave power plants with hydrodynamic floating bodies reliable adjustment is important since desynchronization of the rotor from the orbital flow as a result of vortex breakdown can lead to complete decoupling from the shaft.

In particular, owing to the multichromatic wave states of sea waves it is necessary to perform open-loop and/or closed-loop control of a corresponding system in such a way that there is always an optimum flow against the flow bodies and that the flow bodies are operated as close as possible to the conversion optimum. As a result, a maximum energy yield can be achieved. Actuation variables are here, in particular, the generator torque and the adjustment of the pitch angle of the coupling bodies. This results in corresponding angles of flow against the coupling bodies and a phase angle between the rotation of the system and the wave orbital flow.

U.S. Pat. No. 7,686,583 B2 proposes determining an incoming flow angle of a fluid flowing against a coupling body, on the basis of a measured lift in conjunction with the flow speed. For this purpose, different measuring means, including pressure sensors, are provided. On this basis, it is then possible to perform a control which comprises, for example, adjustment or torsion of the coupling bodies in order to adapt them to an oblique incoming flow or a corresponding re-alignment of the total system. However, in particular local differences at a coupling body cannot be detected by the method disclosed in said document. The method also permits no conclusions to be drawn about an imminent or already occurred vortex breakdown.

Therefore, there is still the need for improved possibilities for operating a wave energy converter.

SUMMARY

According to the disclosure, a method for operating a machine, in particular a wave energy converter, located in choppy waters, for converting energy from a wave movement of a fluid into another form of energy, a computing unit for carrying out said method and a correspondingly operated wave energy converter having the features of the disclosure are proposed. Advantageous refinements are the subject matter of the dependent claims and of the following description.

Within the scope of the disclosure, on the basis of measurement variables of a first, relatively early time a prediction of a wave movement at a second, relatively late time is made, as a result of which the operation of the machine can be significantly improved, in particular pilot control can take place with the result that control errors which occur are reduced. As a result, the control interventions can be reduced and the control becomes more robust. The operation becomes less reactive.

The disclosure proposes a method and a measuring system which can be used to determine a three-dimensional speed potential from which, inter alia, a speed field can then be derived. As a result, the current flow conditions are known, which can be used for particularly efficient pilot control of the machine. In particular, a measuring method for cost-effective and robust 3D data acquisition is proposed. Various prediction possibilities are specified with which the measurement data which are obtained can be extrapolated chronologically and spatially.

According to one aspect of the disclosure, a wave energy converter is operated. The disclosure proposes a method which permits pilot control of the manipulated variables (in particular generator torque and/or pitch angle of the coupling bodies). The operation preferably comprises a control process, wherein the controlled variable can be a phase angle between a rotational movement of a rotor of the wave energy converter and an orbital flow of the wave movement. With respect to further details relating to engagement possibilities and/or control possibilities for the energy conversion reference is made to DE 10 2011 105 177 which was published after the priority date of the present document and whose disclosure is made part of the present disclosure. As a result, the control interventions can be reduced and the control process becomes more robust. The operation of the wave energy converter is improved since there is less need to react to changes which have already occurred (which leads to worsening of the energy acquisition) and instead of which, by way of pilot control, the wave energy converter is already set to expected changes (which reduces or even prevents worsening of the energy acquisition). The conversion efficiency is increased. This applies, in particular, to multichromatic wave states which make particularly stringent requirements of the open-loop/closed-loop control of wave energy converters. Furthermore, particularly advantageous possibilities are provided in respect of protective measures.

In particular for wave energy converters which utilize the hydrodynamic lift principle, very good knowledge of the flow field is decisive since in the case of incorrect open-loop and/or closed-loop control decoupling of the machine from the local incoming flow and therefore the wave movement can occur. In this case, the efficiency of the system would decrease significantly. In addition, the mechanical loading of the machine would increase significantly. Within the scope of the disclosure, the flow field which is induced at the wave energy converter by the waves is calculated in order to permit the machine to be controlled.

Furthermore, flow which is superimposed on the orbital flow can be detected with the presented system and integrated into the calculation. Since this flow is superimposed on the orbital flow of the wave movement, inclusion in the calculation is advantageous in order to increase the conversion efficiency.

A preferred predictable variable which characterizes the wave movement expected at the second, relatively late time, is a speed field or flow field or a speed potential. In this context, the disclosure advantageously utilizes the property of sea waves in that within the scope of the inventive application they can be modeled very well as a speed potential since viscous effects have little influence within the scope of the described application of the disclosure. A speed field is in a vector field which assigns a speed vector to every location in the space.

According to another aspect, the disclosure can also be used in areas in which a prediction of the wave movement provides advantages for the operation or the safety of a technical sea design. The operation can comprise, for example, placing in a position of rest (for example vane position in the case of coupling bodies of wave energy converters). Furthermore, offshore operations can be carried out more efficiently (for example the depositing of a load from a moving ship onto an oil platform or onto the seabed). However, in particular the disclosure can be used in wave power plants in order to increase the conversion efficiency. In this context, the disclosure can be particularly advantageously utilized for the concerted control of multiple power plants (parks). This applies, in particular, to the case in which the absorption characteristic and/or irradiation characteristic of the individual power plants is known and can be described by suitable models.

An initial speed field or initial speed potential is preferably determined at a first location at a first, relatively early time on the basis of measured values, and on the basis of the initial speed field or initial speed potential a result speed field or result speed potential is determined at a second location at a second, relatively late time. The second location is expediently the location of the respective wave energy converter, and the first location can be the same location, but it is preferably on the side facing the incoming wave, at a certain distance from the wave energy converter or the park.

In the paper "Direct Simulation and Deterministic Prediction of Large-Scale Nonlinear Ocean Wave-field" by Guangyu Wu, Department of Ocean Engineering, MIT, (http://hdl.handle.net/1721.1/33450), a method is described, for example in the context of shipping, with which on the basis of measurement variables an initial wave field is determined and the initial wave field is developed further over time in order to predict an expected wave field. The orders of magnitude which are considered comprise several 100 km there. The determination of the initial wave field uses Stokes equations (cf. for example Schwartz, L. W., 1974, Computer extension and analytic continuation of Stokes' expansion for gravity waves, J. Fluid Mech., Vol. 62, 553-578) of a low order (up to the 2nd) for waves with a small height and in addition a nonlinear spectral analysis of a relatively high order (HOS; cf. for example Dommermuth, D. G. & Yue, D. K. P., 1987, A high-order spectral method for the study of nonlinear gravity waves, J. of Fluid Mech. 184) for waves with a relatively large height. The development over time likewise uses an HOS method.

The HOS method is capable of efficiently calculating the development over time of, for example, speed potentials with high accuracy. In order to be able to perform a development over time, it is necessary to know the current speed potential (initial potential) in order to be able to use this as initial conditions in the HOS. In the paper by Wu, a systematic generation of these initial conditions is carried out for the first time. The generation is based on the measurement data of a sensor system.

By suitable correlation of the sensors it is possible to determine the initial potential.

Within the scope of the disclosure it has been realized that this method can surprisingly also be used on much smaller scales (the orders of magnitude which are relevant for wave energy converters comprise only up to a few 100 m) and are therefore very well suited for actuating or operating wave energy converters. Within the scope of the disclosure, preferably both the initial speed potential and the result speed potential are now determined on the basis of the method described there. This predetermined result speed potential can be used, in particular, for pilot control of the wave energy converter, for example for the generator torque control and/or pitch control.

In a further advantageous refinement, the reaction of a wave energy converter to the speed potential is determined in order, for example, to be able to efficiently use wave energy converter parks. The described HOS method can also be used for this purpose.

A computing unit according to the disclosure, for example a control device of one or more wave energy converters is configured, in particular in programming terms, to carry out a method according to the disclosure.

The implementation of the disclosure in the form of software is also advantageous since this permits particularly low costs, in particular if an executing computing unit is still being used for other tasks and is therefore present in any case. Suitable data carriers for making available the computer program are, in particular, disks, hard disks, flash memories, EEPROMs, CD-ROMs, DVDs etc. It is also possible to download a program via computer networks (Internet, Intranet etc.).

Further advantages and refinements of the disclosure can be found in the description and the appended drawing.

Of course, the features which are mentioned above and which are to be explained further below can be used not only in the respectively specified combination but also in other combinations or alone without departing from the scope of the present disclosure.

BRIEF DESCRIPTION OF THE DRAWINGS

The disclosure is illustrated schematically with reference to exemplary embodiments in the drawings and is described in detail below with reference to the drawings.

In the drawings:

FIG. 3 illustrates, in a side view, a possible arrangement of sensors on and around a wave energy converter for converting energy from a wave movement.

DETAILED DESCRIPTION

In the figures, identical or identically acting elements are indicated with identical reference symbols. For the sake of clarity, a repeated explanation will not be given.

Figure 1:
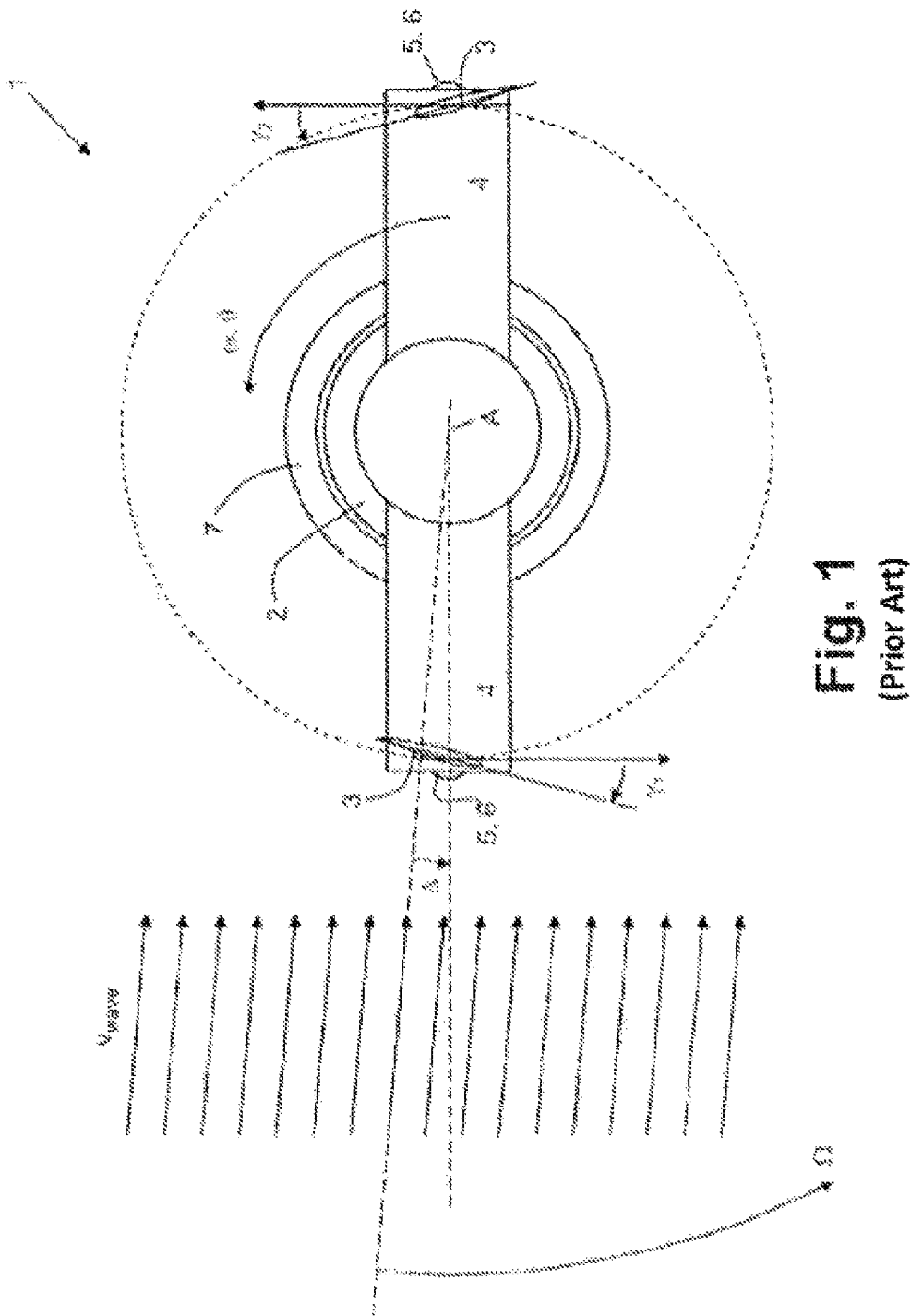
FIG. 1 shows a wave energy converter having a rotor with two coupling bodies in a side view and illustrates the pitch angle γ and the phase angle Δ between the rotor and the orbital flow.

FIG. 1 illustrates a wave energy converter 1 such as can be used as a basis for the present disclosure, having a housing 7 and a rotor 2, 3, 4 which is rotatably mounted thereon and has a rotor base 2 and two coupling bodies 3 which are each attached in a rotationally fixed fashion to the rotor base 2 by means of lever arms 4. The rotor 2, 3, 4 is assumed to be arranged underneath the water surface of a body of water with wave action—for example an ocean. In this context, there will preferably be deep water conditions present in which the orbits of the water molecules run in a largely circular fashion. The rotational axis A of said rotor will be assumed to be oriented largely horizontally and largely perpendicularly with respect to the current propagation direction of the waves of the rippled body of water. The coupling bodies 3 are embodied in the example shown as hydrodynamic lift bodies. The rotating components of the wave energy converter are preferably provided with a largely neutral lift in order to avoid a preferred position. This applies, in particular to components of the rotor which are asymmetrical with respect to the rotational axis and do not have any "corresponding part" which is arranged with point symmetry.

The coupling bodies 3 are arranged at an angle of approximately 180° with respect to one another. The coupling bodies are preferably secured in the vicinity of the pressure point thereof in order to reduce rotational torques which occur during operation and act on the coupling bodies, and in this way to reduce the requirements made of the mounting means and/or the adjustment devices.

The radial distance between the suspension point of a coupling body and the rotor axis is 1 m to 50 m, preferably 2 m to 40 m, particularly preferably 4 m to 30 m and quite particularly preferably 5 m to 20 m.

Two adjustment devices 5 for adjusting the pitch angles $\gamma_1$ and $\gamma_2$ of the coupling bodies 3 between the vane chord and the tangent are additionally illustrated. The two pitch angles $\gamma_1$ and $\gamma_2$ are preferably oriented in opposite directions and preferably have values of −20° to +20°. However, in particular when starting up the machine larger pitch angles can also be provided. The pitch angles $\gamma_1$ and $\gamma_2$ can preferably be adjusted independently of one another. The adjustment devices can preferably be electromotive adjustment devices, preferably with stepping motors, and/or can be hydraulic and/or pneumatic components.

The two adjustment devices 5 can additionally each be assigned a sensor system 6 for determining the current pitch angles $\gamma_1$ and $\gamma_2$. A further sensor system (not illustrated) can determine the rotational angle of the rotor base 2 with respect to the housing 7.

The orbital flow flows against the wave energy converter 1 with an incoming flow speed of $v_{wave}$. This incoming flow is the orbital flow of sea waves whose direction changes continuously. In the illustrated case, the rotation of the orbital flow is oriented in the counterclockwise direction, and the associated wave therefore propagates from right to left. In the monochromatic case, the incoming flow direction changes here with the angular speed $\Omega=2\pi f=\text{const.}$, where f is the frequency of the monochromatic wave. In contrast, in multichromatic waves, $\Omega$ is subject to a change over time, $\Omega=f(t)$ since the frequency f is a function of time, $f=f(t)$. There is provision that the rotor 2, 3, 4 rotates synchronously with the orbital flow of the wave movement with an angular speed $\omega$, wherein the term synchronicity is to be understood as averaged over time. In this context, for example $\Omega \approx \omega$. A value or a value range for an angular speed $\omega$ of the rotor is therefore predefined on the basis of an angular speed $\Omega$ of the orbital flow or adapted thereto. In this context, constant control or brief or short-term adaptation can take place.

As is explained in more detail below, a first torque which acts on the rotor 2, 3, 4 is generated as a result of the effect of the flow with the incoming flow speed $v_{wave}$ against the coupling bodies.

Furthermore there is provision that a preferably variable second torque in the form of a resistance, that is to say breaking torque, or an acceleration torque, can be applied to the rotor 2, 3, 4. Means for generating the second torque are arranged between the rotor base 2 and the housing 7. There is preferably provision here that the housing 7 is the stator of a directly driven generator and the rotor base 2 is the rotor of this directly driven generator whose bearing, windings, etc. are not illustrated; here, the second torque is determined by the generator torque. However, as an alternative to this, other drive train variants can also be provided in which the means for generating the second torque comprise, in addition to a generator, also a transmission and/or hydraulic components such as, for example, pumps. The means for generating the second torque can additionally or else exclusively comprise a suitable brake.

Between the rotor orientation, which is illustrated by a lower dashed line which runs through the rotor axis and the center of the two adjustment devices 5, and the direction of the orbital flow which is illustrated by an upper dashed line which runs through one of the speed arrows $v_{wave}$, there is a phase angle $\Delta$ whose absolute value can be influenced by adjusting the first and/or second torques. In this context, a phase angle from −45° to 45°, preferably from −25° to 25° and particularly preferably from −15° to 15°, appears particularly advantageous for generating the first torque since here the orbital flow $v_{wave}$ and the incoming flow are largely perpendicularly oriented with respect to one another owing to the intrinsic rotation $v_{rotor}$ (see FIG. 2), which leads to a maximization of the rotor torque. Maintaining the required synchronicity means $\Delta \approx \text{const.}$, wherein oscillation about a mean value of $\Delta$ is also understood to be synchronous. The illustration of the coupling bodies in FIG. 1 and in the further figures is then given merely by way of example for the definition of the different machine parameters. During operation, the pitch angles of the two coupling bodies are preferably embodied in an opposed fashion to that in the illustration. The coupling body on the left in FIG. 1 would then be adjusted toward the inside and the right-hand coupling body in FIG. 1 toward the outside. In this context, in contrast to this schematic illustration with uncurved symmetrical profiles it is also possible, in particular, to provide for the use of other profile geometries which can also be adapted and/or transformed with respect to the circular path.

Within the scope of the disclosure, it is possible to determine, in particular, $v_{wave}$ and $\Omega(t)$ in advance on the basis of the previously determined result speed potential, and pilot control of the first and/or second torque can therefore be carried out correspondingly. In this context, in the case of small rotor diameters it may be sufficient to determine the flow vector at the center point of the rotor. In contrast, in the case of relatively large rotor diameters knowledge of the local flow vector at the coupling bodies is advantageous. The first torque is influenced substantially by means of the pitch angles $\gamma_1$ and $\gamma_2$ as well as by means of the phase angle $\Delta$ between the rotation $\omega$ and orbital flow $\Omega$ and the resulting incoming flow speed, and the second torque is influenced by means of the torque which is tapped from the generator and which can be influenced, for example, by predefining the exciter current of the rotor.

Figure 2:
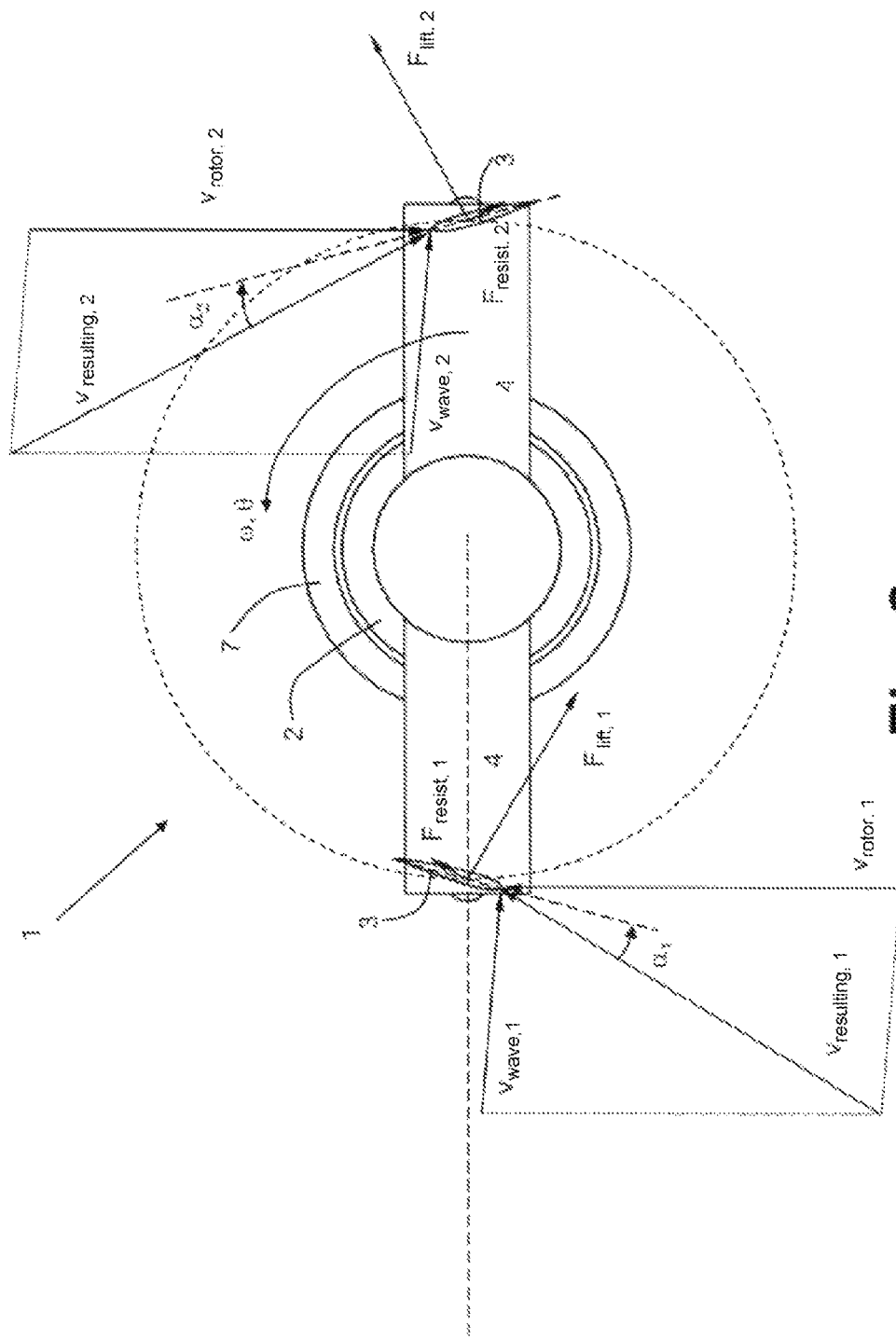
FIG. 2 shows resulting incoming flow angles $\alpha_1$ and $\alpha_2$ and resulting forces at the coupling bodies of the rotor from FIG. 1.

FIG. 2 is a schematic illustration of the resulting incoming flow ratios and the forces which occur at the coupling bodies which give rise to a rotor torque. In this context, it is assumed in a simplifying fashion that the flow is embodied uniformly over the entire rotor cross section and has the same absolute value and the same direction. However, in particular for rotors with large radial extents, in particular in the case of the illustrated horizontal orientation of the lever arms 4 the various coupling bodies 3 of the rotor 2, 3, 4 may be located at different positions relative to the wave, which gives rise to a locally different incoming flow direction. However, this may be compensated, for example, using an individual setting of the respective pitch angle $\gamma$.

FIG. 2 illustrates, on both coupling bodies, the local incoming flows as a result of the orbital flow ($v_{wave,i}$ and as a result of the intrinsic rotation ($v_{rotor,i}$), the incoming flow speed ($v_{resulting,i}$) resulting from these two incoming flows, and the resulting incoming flow angles $\alpha_1$ and $\alpha_2$. Furthermore, the lift forces and resistance forces $F_{lift,i}$ and $F_{resist,i}$ which occur at the two coupling bodies are also derived and are dependent both on the absolute value of the incoming flow speed and on the incoming flow angles $\alpha_1$ and $\alpha_2$ and therefore also on the pitch angles $\gamma_1$ and $\gamma_2$ and are oriented perpendicularly or parallel with respect to the direction of $v_{resulting,i}$.

For the illustrated case, the two lift forces $F_{lift,i}$ result in a rotor torque in the counterclockwise direction, and the two resistance forces $F_{resist,i}$ result in a rotor torque which is relatively small in terms of absolute value and is in the opposite direction (that is to say in the clockwise direction). The sum of the two rotor torques brings about a rotation of the rotor 2, 3, 4 whose speed can be set by the adjustable second torque.

If synchronicity where $\Delta \approx$ const. is reached, from FIG. 2 it is immediately apparent that for monochromatic cases in which the absolute value of the flow $v_{wave,i}$ and the angular speed $\Omega$ remain constant, the incoming flow conditions of the two coupling bodies 3 do not change over the rotation of the rotor. This means that at constant pitch angles $\gamma$ a largely constant rotor torque is generated which can be tapped with a constant second torque of a corresponding generator. In contrast, in the case of multichromatic waves, changes occur in the angular speed $\Omega$ and in the absolute value $v_{wave}$ which can be taken into account by adapting the pitch angles and/or the second torque. This is particularly advantageously achieved by means of pilot control on the basis of the present disclosure.

From the forces which act on the coupling bodies, there is, in addition to a rotor torque, also a resulting rotor force as a result of vectorial addition of $F_{lift,1}$, $F_{resist,1}$, $F_{lift,2}$ and $F_{resist,2}$. The latter acts as a bearing force on the housing and must be correspondingly supported if displacement of the housing is undesired. While the rotor torque remains constant when identical incoming flow conditions are assumed ($v_{wave,i}$, $\Delta$, $\Omega$, $\omega$, $\alpha_1$, $\alpha_2$, $\gamma_1$, $\gamma_2$=const.), this applies to the resulting rotor force only in terms of absolute value. The direction of the rotor force also changes correspondingly owing to the constantly changing direction of flow of the orbital flow and the synchronous rotor rotation. In the case of multichromatic waves, the absolute value of the rotor force also changes continuously in addition to the direction.

In addition to the rotor torque being influenced by an adjustment of the rotor angles $\gamma$ and/or an adjustment of the phase angle $\Delta$, the absolute value and direction of this rotor force can also be influenced by changing the pitch angles $\gamma$ (as a result of which the incoming flow angles $\alpha$ change), by changing the rotor angle speed $\omega$ and/or the phase angle $\Delta$—for example by changing the generator torque which is applied as a second torque (as a result of which $v_{rotor}$ changes), and/or by means of a combination of these changes.

In this context, the synchronicity which is described in the introduction is preferably maintained.

FIG. 3 shows different preferred sensor positions for mounting sensors for determining the flow conditions on a wave energy converter 20, and particularly preferably for determining the local incoming flow conditions at the coupling bodies of a wave energy converter. Furthermore, the movement behavior of the wave energy converter 1 can also be determined with sensors mounted thereon. A wave propagation direction is denoted by W. The wave energy converter 20 is equipped with a frame for positional stabilization, the frame is in turn equipped with a mooring for maintaining the position and together with a hydrostatic lift system for supporting the second torque.

In order to selectively influence the rotor forces, knowledge of the incoming flow ratios at the coupling bodies, and in particular the local flow speed and flow direction, is advantageous. For this purpose, sensors can be arranged on the rotor (position 101, 20) and/or on the coupling bodies (position 102) and/or on the frame (position 103) and/or floating under the surface of the water in the vicinity of the machine (position 104) and/or on the surface of the water in the vicinity of the machine (position 105) and/or on the seabed underneath the machine (position 106) and/or floating under the surface of the water mounted (position 107) ahead of the machine (or of a park composed of a plurality of machines) and/or mounted (position 108) ahead of the machine (or of a park composed of a plurality of machines) on the seabed, and/or mounted (position 109) in a floating fashion ahead of the machine (or of a park composed of a plurality of machines) and/or above the surface of the water (position 110), for example in a satellite. Additional sensors 105' to 109' can be arranged on the leeside with respect to the wave propagation direction. Such leeside sensors permit interaction of the wave energy converter with entered waves to be determined. On the basis of this knowledge, the result of the interaction can be checked and, if appropriate, the interaction can be changed in a targeted fashion by means of a machine control process.

In this context, sensors and corresponding combinations, inter alia from the following classes, can be used:

Pressure sensors (for determining the difference and/or absolute pressure) for determining hydrostatic (wave height) and/or hydrodynamic (incoming flow) pressures; in particular in the case of a different geometric orientation for sensing different, preferably orthogonal, measuring directions it is possible to acquire a complete measuring image. This is converted from a punctiform system into a 3D system by superimposition of a plurality of measuring points.

Ultrasound sensors for determining flow rates (for example by means of particles carried along in the fluid), advantageously in a plurality of dimensions.

Laser sensors for determining flow rates and/or a geometry of a water surface in order to determine a propagation direction and the wave height, and the propagation speed derived therefrom.

Radar sensors for determining the surface geometry.

Acceleration sensors for determining flow ratios and/or movements of the entire system and/or of the rotor and/or of the surface speeds of the body of water and/or for determining the orientation of a body, in particular of the rotor, by detecting the earth's gravitational field; (for example acceleration sensors which are carried along in floating bodies with neutral lift such as, for example, balls, which acceleration sensors can sense the flow speed and direction by means of the current acceleration values; the transmission of the measurement signals can occur, for example, by radio. In addition to a "free swimming" body it is also possible for the latter to be suspended from a joint; the movements can also be evaluated with acceleration sensors, wherein the movements are restricted to 2D unless the connecting rod is of telescopic design).

Inertial sensors for measuring different translational and/or rotational acceleration forces.

Mass flow meter/flow sensors and hot wire anemometers for determining a flow speed.

Bending transducers for determining a flow speed (by means of the degree of deformation).

Expansion sensors for determining the deformation of the coupling bodies.

Anemometers for determining a flow speed.

Angle sensors (absolute or incremental), tachometers for determining pitch angles of the coupling bodies and/or of the rotational angle of the rotor.

Torque sensors for determining the adjustment forces and/or holding forces of the coupling body adjustment system.

Force sensors for determining the rotor force in terms of absolute value and direction.

Satellites for determining the surface geometry of the ocean region.

GPS data for determining machine position and/or movement.

Gyroscopes for determining a rotational rate.

Measuring bodies floating on the surface, such as for example buoys (up and down movement, rocking movement); the movements here can also be sensed in all spatial directions with acceleration sensors (for example gyroscopically suspended ones).

The instantaneous local incoming flow conditions of the coupling bodies and/or the flow field around the machine and/or the flow field running into the machine/park composed of a plurality of machines and/or the natural oscillations of the machine can, in particular, be determined predictively from these sensor signals with the result that the second braking torque and/or the pitch angles $\gamma$ of the coupling bodies 3 can be suitably set in order to achieve the open-loop/closed-loop control objectives. This can be done, in particular, by using the HOS method explained at the beginning.

The open-loop/closed-loop control objectives include not only optimizing the rotor torque but also, in particular, maintaining synchronicity and/or avoiding a vortex breakdown at the coupling bodies and/or influencing the rotor forces in order to stabilize them and/or shift them and/or selective excitation of oscillations and/or rotation of the system in order to bring about positionally correct orientation with respect to the incoming wave. In addition, by means of the open-loop/closed-loop control together with changing of the at least one lift system it is also possible to influence the immersion depth and the supporting torque. By adapting the damping plate resistance it is also possible to influence the machine oscillation behavior. The open-loop and closed-loop control within the scope of the disclosure is advantageously carried out by taking into account the previously determined result speed potential. In this context, within the scope of this application the term synchronicity is considered to be fulfilled when the rotor rotates synchronously with the flow vector of at least one main component of the wave.

In this context, measurements of the flow field which already take place ahead of the machine or a park composed of a plurality of machines, and from which the flow field which is present at the machine or machines at a relatively late time can be calculated, appear particularly advantageous.

Together with a virtual model of the machine, pilot control of the manipulated variables can be derived therefrom and then adapted by means of an adjustment process. By means of such a procedure, in multichromatic states of the sea it is possible, in particular, to acquire the significant energy-carrying wave portions computationally and to match the open-loop/closed-loop control of the energy converter suitably thereto.

If the sensor system is arranged spatially around the system/the park of systems to be controlled, the further propagation can then be determined spatially and chronologically by suitable computational models, as a result of which very good pilot control of the system is possible. This applies, in particular, to multichromatic wave states. The reconstruction of the existing speed potential at a given time ("initial speed potential") is included in the method as a starting condition. The determination of the initial speed potential itself is formulated as an optimization problem. The sensors which are arranged spatially in a suitable way supply a time series of the measurement variables which serve as input data for the optimization problem. For the purpose of reconstruction of the speed potential, an HOS calculation is run through iteratively with the objective of generating a speed potential whose data correspond as precisely as possible to the sensor data. A suitable quality criterion is, for example, an RMS method which compares the deviation of the data generated by the reconstructed wave field with the real measurement data and combines them to form a comparison value which is to be minimized in the iteration steps. Since in the HOS calculation it is possible to calculate not only pressure data but also particle speeds and wave heights in the entire fluid domain, in principle all of the abovementioned types of sensor are suitable for reconstruction of the speed potential. The accuracy of the reconstruction is highly significant for the accuracy of the development over time of the speed potential since the equations which describe the speed potential are nonlinear, and therefore react sensitively to deviating starting conditions.

Sensor types which have low noise and are installed in as stationary a fashion as possible (seabed mounted) should be selected. Possible movements of the sensors can also be included in the calculation as long as the movement is known. A reconstruction according to the linear wave theory is applied as a starting point of the iteration schema. Deviations of the simulation data from the measurement data of the sensors are minimized iteratively in the chronological profile by means of the iteration schema by virtue of the fact that successive, relatively high order terms in the HOS method are included in the calculation in order to allow for the nonlinearities of the wave equation. In order to be able to carry out a sufficiently large number of iterations, it can be helpful to carry out the computational steps in parallel.

The sensors can also be arranged on the actual system. In this context, both arrangement on the machine housing and arrangement on moving parts of the machine are possible. In both cases, sensing of the housing movement is additional expedient at least in systems with self-referencing housing which responds to the wave movement. This can be done, for example, by using acceleration sensors or other sensors. For this case, there is preferably provision for a wave prediction, with which the flow spectrum of the following time period (for example for the next 5-6 seconds) can be predicted, to be derived from the measurement data of the current flow field at the machine using suitable models. With this inventive embodiment it is also possible to carry out very good pilot control of the machine behavior, even in multichromatic bodies of water.

What is claimed is:

1. A method for operating a machine located in choppy waters, comprising:
   determining measurement variables at a first, relatively early time;
   calculating a variable characterizing a wave movement expected at a second, relatively late time on the basis of the measurement variables determined at the first, relatively early time; and
   operating the machine taking into account the variable characterizing the wave movement expected at the second, relatively late time,
   wherein the variable characterizing the wave movement expected at the second, relatively late time is a speed field or a speed potential, and
   wherein, on the basis of the measurement variables determined at the first, relatively early time, an initial speed potential or an initial speed field is determined at a first location, and a result speed potential or a result speed field expected at the second, relatively late time is calculated on the basis of the initial speed potential or initial speed field.

2. The method according to claim 1, wherein the operation of the machine comprises influencing at least one manipulated variable of the machine taking into account the variable characterizing the wave movement expected at the second, relatively late time.

3. The method according to claim 2, wherein the influencing of the at least one manipulated variable of the machine comprises pilot control of the manipulated variable.

4. The method according to claim 3, wherein the machine is a wave energy converter configured to convert energy from the wave movement into another form of energy, and
   wherein the at least one manipulated variable comprises one or more of an electric generator torque and a pitch angle of at least one coupling body of the wave energy converter around which there is a flow.

5. The method according to claim 4, wherein the wave state is one or more of a wave height, a wave length, a wave frequency, a wave propagation direction, and a wave propagation speed.

6. The method according to according to claim 2, wherein the machine is a wave energy converter configured to convert energy from the wave movement into another form of energy, and
   wherein the at least one manipulated variable comprises one or more of an electric generator torque and a pitch angle of at least one coupling body of the wave energy converter around which there is a flow.

7. The method according to claim 1, wherein the machine is a wave energy converter configured to convert energy from the wave movement into another form of energy.

8. The method according to claim 7, wherein the operation of the wave energy converter comprises adjusting a phase angle between a rotational movement of a rotor of the wave energy converter and an orbital flow of the wave movement.

9. The method according to claim 1, wherein the operation of the machine comprises movement of components of the machine into a protective position if the variable characterizing the wave movement expected at the second, relatively late time exceeds a threshold value.

10. The method according to claim 1, wherein the determination of the initial speed potential or the initial speed field is formulated as an optimization problem into which the measurement variables determined at the first, relatively earlier time are input.

11. A computing unit configured to implement a method for operating a machine located in choppy waters, the method including:
    determining measurement variables at a first, relatively early time,
    calculating a variable characterizing a wave movement expected at a second, relatively late time on the basis of the measurement variables determined at the first, relatively early time, and
    operating the machine taking into account the variable characterizing the wave movement expected at the second, relatively late time,
    wherein the variable characterizing the wave movement expected at the second, relatively late time is a speed field or a speed potential, and
    wherein, on the basis of the measurement variables determined at the first, relatively early time, an initial speed potential or an initial speed field is determined at a first location, and a result speed potential or a result speed field expected at the second, relatively late time is calculated on the basis of the initial speed potential or initial speed field.

12. A wave energy converter for converting energy from a wave movement of a fluid into another form of energy, comprising:
    at least one rotor;
    at least one energy converter coupled to the at least one rotor; and
    a computing unit configured to implement a method for operating the converter, the method including:
        determining measurement variables at a first, relatively early time,
        calculating a variable characterizing a wave movement expected at a second, relatively late time on the basis of the measurement variables determined at the first, relatively early time, and
        operating the converter taking into account the variable characterizing the wave movement expected at the second, relatively late time,
        wherein the variable characterizing the wave movement expected at the second, relatively late time is a speed field or a speed potential, and
    wherein, on the basis of the measurement variables determined at the first, relatively early time, an initial speed potential or an initial speed field is determined at a first location, and a result speed potential or a result speed field expected at the second, relatively late time is calculated on the basis of the initial speed potential or initial speed field.

13. The wave energy converter according to claim 12, further comprising one or more of at least one sensor and at least one sensor system configured to determine one or more of a rotor body position, a coupling body position, a phase angle between an orbital flow and a rotational movement of the at least one rotor, an operating state of the wave energy converter, a wave state, a flow field, and an incoming flow direction, and
    wherein the one or more of the at least one sensor and the at least one sensor system on the wave energy converter has sensors arranged in the surroundings thereof and/or at a distance therefrom.

* * * * *